May 31, 1960  A J. LOWERY  2,938,741

CABLE CLAMP FOR ELECTRIC OUTLET SWITCH BOX

Filed Oct. 9, 1958

A. J. LOWERY
INVENTOR.

BY *Herbert J. Brown*

ATTORNEY

United States Patent Office 2,938,741
Patented May 31, 1960

2,938,741

CABLE CLAMP FOR ELECTRIC OUTLET SWITCH BOX

A J. Lowery, 1037 W. Frey, Stephenville, Tex.

Filed Oct. 9, 1958, Ser. No. 766,243

3 Claims. (Cl. 285—128)

This invention relates to electric outlet boxes or similar devices receiving the ends of conductor cables and has reference to improvements in cable clamps therefor. Generally, the invention is directed to a clamp which will engage and firmly grip one or more cables in a box by merely applying pressure on the clamp.

An object is to provide an improved clamp in a box of the described class for saving time when installing conductor cables.

Another object is to eliminate clamp screws which necessarily project through the boxes and frequently require the drilling of a hole in a building structure member to accommodate the projecting screw end.

Another object is to provide a clamp member which will not turn or hang in its box prior to installation.

A further object is to provide a clamp which is always positioned to receive the cable to be installed.

A still further object is to provide a clamp which will quickly release a cable when required.

These and other objects of the invention will become apparent from the following description and the accompanying drawing, wherein.

Figure 6:
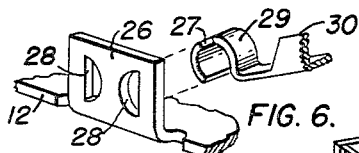
Figure 6 is a broken exploded perspective view illustrating a preferred means for hingedly engaging clamps in the outlet box.
Figure 4:
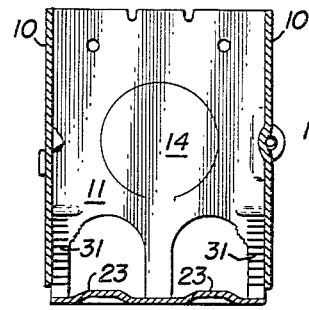
Figure 4 is a vertical transverse sectional view of the box illustrated in Figure 1 and showing the cable receiving knock outs removed.
Figure 1:
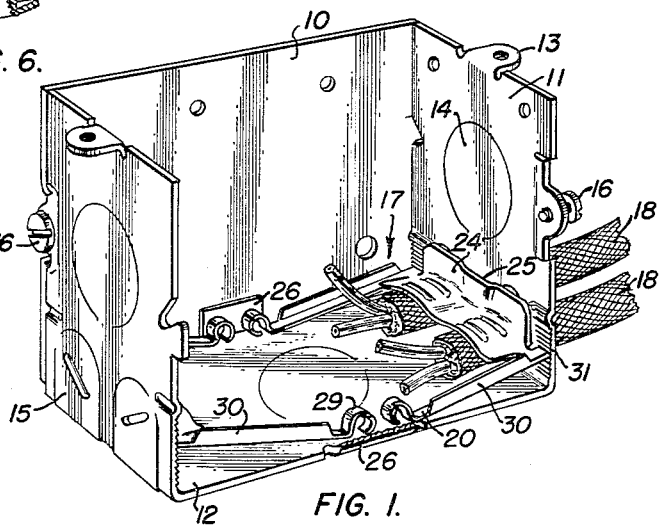
Figure 1 is a broken perspective view of an electric outlet box showing a clamp in accordance with the invention mounted therein.

The outlet box shown is rectangular and is comprised of sides 10, ends 11, a bottom 12, attaching ears 13, circular knock outs 14 and cable receiving knock outs 15 in side by side relation in the box ends 11 adjacent the bottom 12, all in the usual manner. In the particular box shown, the sides 10 are demountable and are held in place by screws 16 in the ends 11, and which construction is conventional and is not, therefore, described in detail. The box shown is exemplary, and it is to be understood that other boxes may be used within the scope of the appended claims.

The clamp members 17 for engaging the ends of cables 18 are each comprised of a cross member 19 and side members 20. The cross members 20 are of sheet metal and have arcuate portions 21 to accommodate the cables 18. Transverse detents 22 are formed in the arcuate portions 21 for gripping the cable; similarly, there are inwardly formed projections or ribs 23 in the bottom 12 for engaging the opposite sides of the cable. The sides of the cross members 19 adjacent the box ends are upwardly turned to provide flanges 24, the upper center edges of which are inwardly cupped, as at 25, for releasing the clamps 17 in the manner hereinafter described.

The side members 20 are integral at their outer or extending ends with the ends of the cross members 19, whereas the remaining ends are hingedly connected with upturned ears 26 at the side center portions of the box bottom 12. In conventional boxes not having the last referred to ears 26, the hinged connection may be with corresponding locations in the box sides, such as 10.

In the form of the invention shown, the hinged connections of the side members 20 with the ears 26 are by means of arcuate lateral projections 27 on the ends of the side members, which projections loosely engage semicircular openings 28 in the ears. The terminal ends 29 of the side members 20 are arcuate to provide a spring action to be described. The arcs of the terminal ends or springs 29 are of greater degree than the arcs of their projections 27, as particularly shown in Figure 6. In order to place the spring action in the arcuate springs 29, upstanding flanges 30 are provided along the sides of the side members 20.

The inner surfaces of the box ends 11 have vertical serrations 31 opposite the ends of the side members 20, the latter having knife edges 32 for engaging the serrations.

Figure 5:
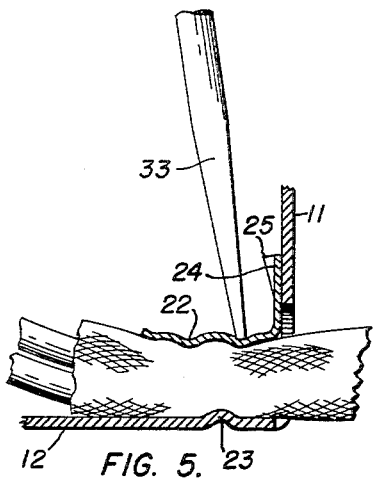
Figure 5 is an enlarged broken vertical sectional view showing the application of pressure on a clamp for engaging a cable.
Figure 2:
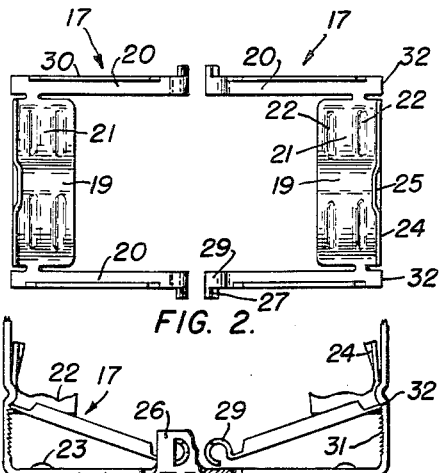
Figure 2 is a plan view of a pair of clamps, first illustrated in Figure 1.
Figure 3:
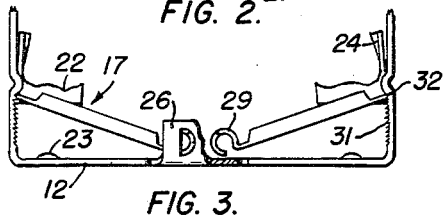
Figure 3 is a broken elevation showing the position of the clamps prior to receiving the cables.
Figure 7:
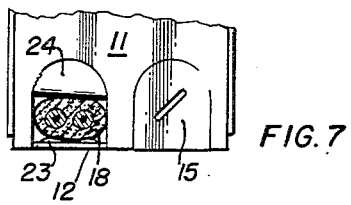
Figure 7 is a broken end elevation of an outlet box and showing a cable (illustrated in section) secured therein.

In operation, the described box is installed in the usual manner with the desired number of cable receiving knock outs removed. The cable 18 is then inserted and pressure is applied to the clamp or clamps 17 by means of a relatively long hand tool, such as a screw driver 33 as shown in Figure 5. The arcuate springs 29 are compressed as the knife edge ends 32 of the side members 20 move downwardly over the serrations 31. When the cables 18 are firmly gripped the screw driver 33 is removed. To release the clamp 17, the screw driver 33 is inserted in the cup 25 of the flange 24 and turned, thus removing the knife edges 32 from the serrations 31, after which the cross member 19 is pried upwardly above the serrations.

The invention is not limited to the exemplary construction herein shown and described, but may be varied within the scope of the appended claims.

What is claimed is:

1. A cable clamp for an electric outlet box having a bottom and side and end walls at least one of said walls having cable receiving openings therein positioned near the bottom of said box, said clamp comprising a cross member within said box and above said cable receiving openings prior to engaging said cable, side members secured at corresponding ends to the ends of said cross member, hinge connections attaching the remaining ends of said side members with said box near the bottom thereof, a row of serrations in the wall of said box including said cable receiving openings and, edges on the ends of said side members opposite their hinge connections, said edges being positioned to engage said serrations.

2. A cable clamp for an electric outlet box as defined in claim 1 and wherein said side members include compressible springs within the length thereof.

3. A cable clamp for an electric outlet box as defined in claim 1 and wherein said cross member includes an upturned flange along the side thereof adjacent said wall and including a screw driver receiving disk in the upper center edge thereof.

No references cited.